United States Patent [19]

Kawamura et al.

[11] 4,079,387

[45] Mar. 14, 1978

[54] COUNTER CIRCUIT FOR A CAMERA

[75] Inventors: Masaharu Kawamura, Hino; Nobuaki Sakurada; Tadashi Ito, both of Yokohama; Hiroyashu Murakami, Tokyo; Fumio Ito, Yokohama; Nobuhiko Shinoda, Tokyo, all of Japan

[73] Assignee: Canon Kabushiki Kaisha, Tokyo, Japan

[21] Appl. No.: 688,760

[22] Filed: May 21, 1976

[30] Foreign Application Priority Data

May 27, 1975 Japan .................................. 50-63618
Jun. 15, 1975 Japan .................................. 50-86397

[51] Int. Cl.² .......................... G03B 17/00; G03B 7/08
[52] U.S. Cl. ............................... 354/23 D; 354/60 A; 354/38; 354/271; 354/289
[58] Field of Search .................... 354/23 D, 29, 37, 43, 354/44, 60 R, 60 A, 271, 289; 340/146, 2, 148, 359; 235/92 DE; 178/87

[56] References Cited

U.S. PATENT DOCUMENTS 3,697,981  10/1972  Harkin et al. ...................... 340/359

FOREIGN PATENT DOCUMENTS 2,434,152  2/1975  Germany ........................... 354/23 D Primary Examiner—Russell E. Adams
Attorney, Agent, or Firm—Toren, McGeady and Stanger

[57] ABSTRACT

The present invention relates to a counter circuit for a camera in which an exposure information is converted into a number of pulses in accordance with the exposure information while a brush is moved sliding on conductor contacts, particularly to a counter circuit so designed that the influence of the pulses generated due to the chattering at the time of the contact of the brush with the conductor contacts upon the counter circuit is prevented.

14 Claims, 14 Drawing Figures

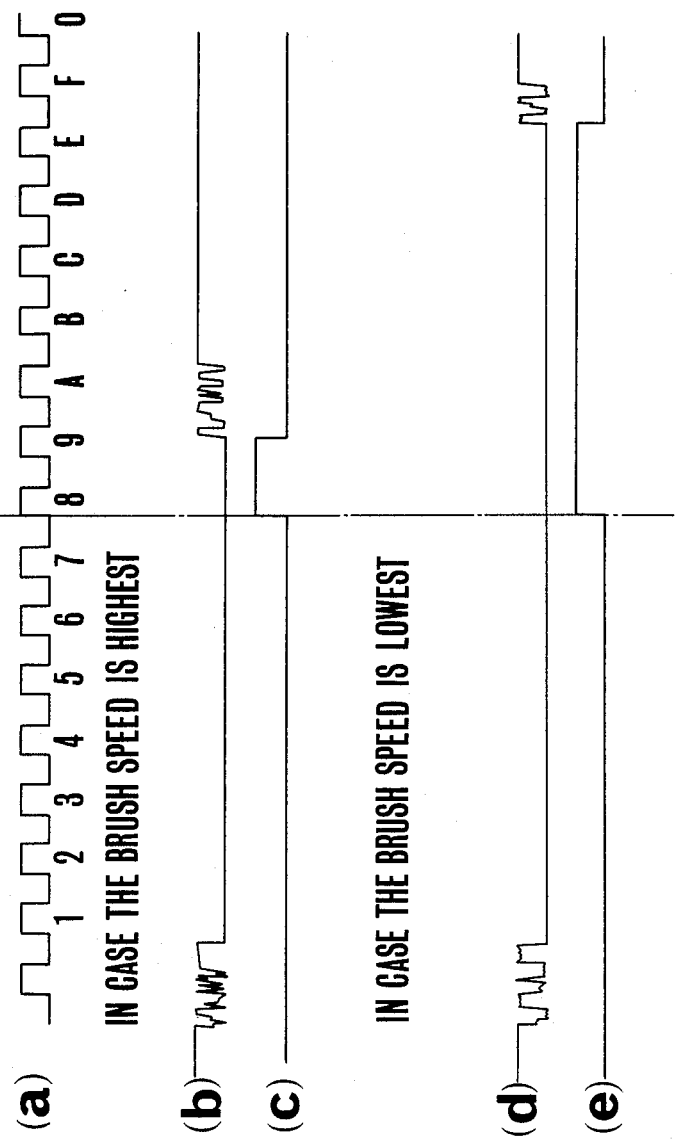

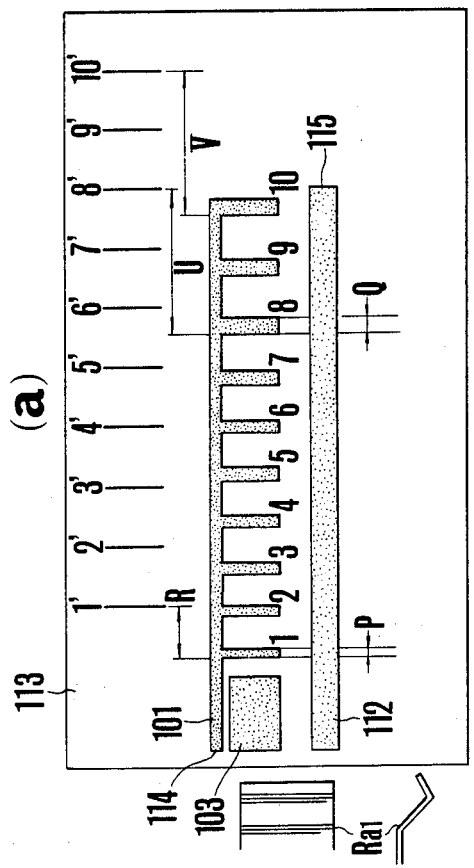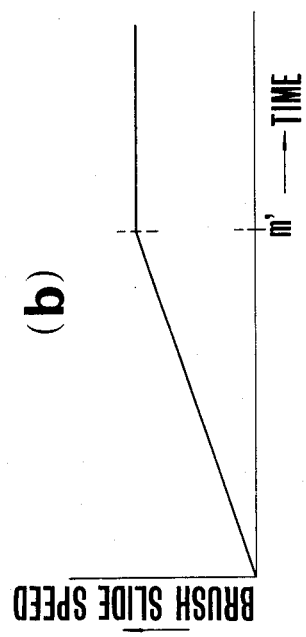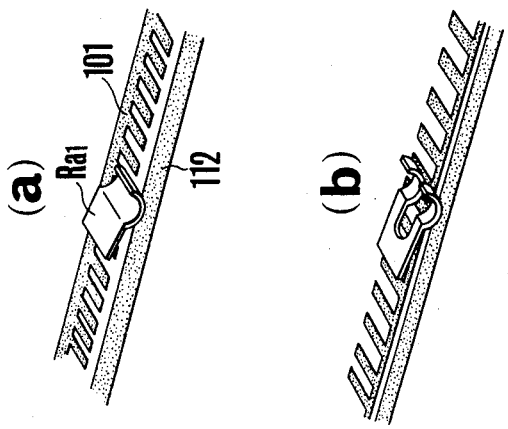

COUNTER CIRCUIT FOR A CAMERA

BACKGROUND OF THE INVENTION

1. Field of the Invention

The present invention relates to a counter circuit of a camera so designed that the influence of the pulse signal generated due to the initial chattering caused by the contact of the brush with the conductor can be avoided when the exposure information is converted into the pulse number by means of a brush means sliding over the conductor contacts such as comb tooth shaped conductor pattern.

2. Description of the Prior Art

Generally in case of the exposure amount control device for a camera so designed that various photographic informations are operated into digital values in accordance to which value the shutter speed or the aperture is controlled, the various photographic informations are set in voltages in analog values which voltages are put in the operation circuit in which the various photographic informations are operated as digital value, by converting the voltages into digital values by means of an A - D converter. However, in accordance with the above mentioned method not only A - D converter for converting voltages into digital values is needed but also the circuit composition becomes complicated, which is quite inconvenient for the application in the compact camera.

Consequently, a method has been proposed, whereby a brush is made to slide over the conductor contacts such as comb tooth shaped conductor pattern in functional engagement with the comb tooth shaped conductor pattern, and the pulses whose number corresponds with the number of the contacts of the brush with the contacts are produced and put in the counter such as binary counter in such a manner that the set exposure informations are directly converted into digital value.

However by means of the above mentioned method a chattering takes place at the contact of the brush with the conductor contacts because the pulses are produced by the contact of the brush with the conductor contact, so that at the time of the contact of the brush with the conductor contacts pulses are produced due to the chattering and therefore the pulses to be counted in the counter includes the pulses due to the chattering, which is inconvenient because it is impossible to obtain an exact contact number of the brush with the conductor contacts.

SUMMARY OF THE PRESENT INVENTION

A purpose of the present invention is to offer a counter circuit for camera so designed that the miscounting due to the pulses generated by the chattering can be eliminated when the pulses corresponding to the exposure informations are counted by means of a brush and conductor contacts such comb tooth shaped pattern.

Another purpose of the present invention is to offer a counter circuit for camera so designed that the influence of the chattering is prevented, whereby a first counter for counting the clock pulses during the contact time of the brush with the conductor contacts in the counter circuit of the above mentioned type is provided so as to produce output signals after the first counter has counted a certain determined number of the clock pulses, while a second counter for counting the output signals produced by the first counter is provided in such a manner that the first counter produces the output signals to be counted only after the brush has come into the complete contact with the conductor contacts.

Further another purpose of the present invention is to offer a counter circuit for camera so designed that the counting of the clock pulses by means of the first counter is not repeated at the contact time of the brush with the conductor contacts.

Further another purpose of the present invention is to offer a counter circuit for camera so designed that the counter circuit for preventing the miscounting due to the chattering consists of digital circuits so as to be integrated as one body with the exposure control circuit for a digitally controlled camera.

Further, other purposes of the present invention will be disclosed out of the explanations to be made below in accordance with the accompanying drawings.

BRIEF DESCRIPTION OF THE DRAWINGS

FIG. 10 shows timing charts for explaining the operation of the circuit shown in FIG. 9.

FIG. 11(a) shows an embodiment of the comb tooth shaped conductor pattern to be used in the counter circuit in accordance with the present invention.

FIG. 11(b) shows a diagram for the brush slide characteristics.

FIG. 12 shows the relation between the comb tooth shaped conductor pattern and the slide brush.

DESCRIPTION OF THE PREFERRED EMBODIMENTS

Figure 1:
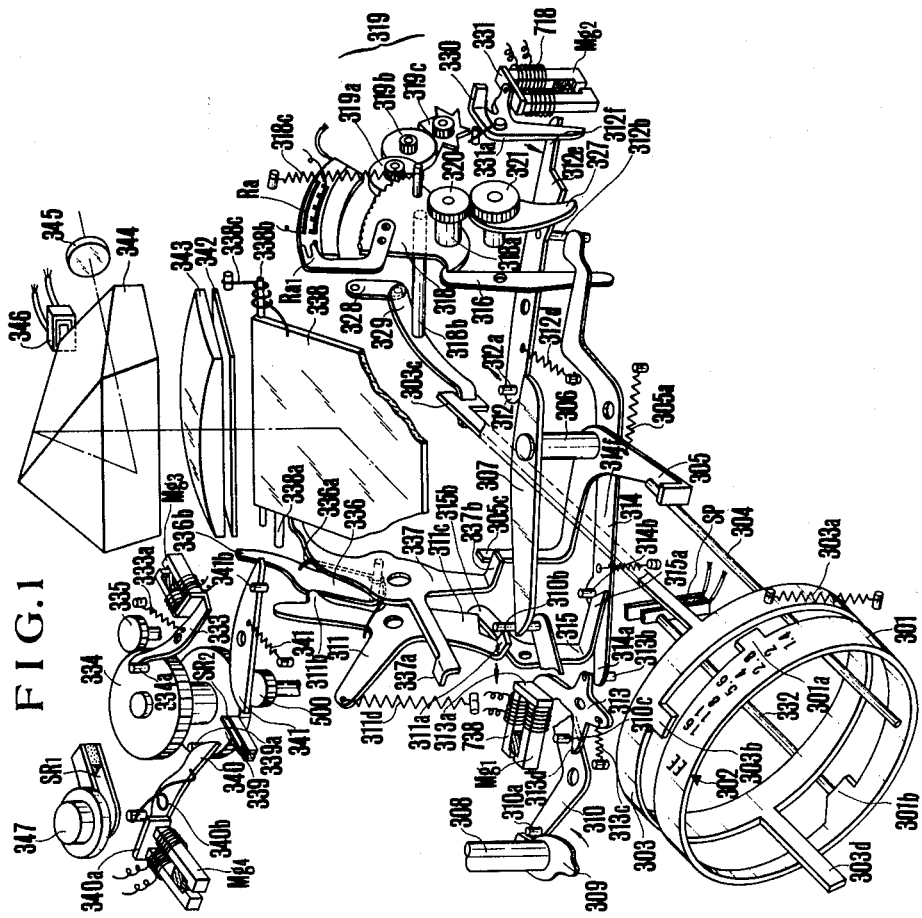
FIG. 1 shows an embodiment of the mechanism of the aperture control part of a camera in which the counter circuit in accordance with the present invention is applied.

FIG. 1 shows an embodiment of the aperture control part of the camera in which the counter circuit in accordance with the present invention is applied, whereby the film has been wound up while the shutter has been charged. 301 is the aperture ring on which the automatic aperture index EE and the manual aperture index are engraved and the projecting part 301a and the cam part 301b are provided. 302 is the index for making the automatic aperture index EE coincide with the manual aperture index. 303 is the aperture preset ring being urged along the clockwise direction by means of the spring 303a and presenting a projecting part 303b engageable with the projecting part 301a of the aperture ring 301. Hereby the aperture preset ring 303 is provided with an arm 303c and further serves to determine the rotation of the bell crank by means of the lever 303d through the aperture set cam ring not shown in the drawing, whereby the bell crank serves to determine the opening degree of the aperture, controlling the rotation of the aperture driving ring not shown in the drawing. 304 is a pin provided on the aperture driving ring, whereby the one end of the pin 304 is engaged with the automatic aperture lever 305 urged by means of the spring 305a along the counter clockwise direction. This automatic aperture lever 305 presents a rising up part 305c. Further, on the automatic aperture lever 305 an intermediary lever 307 is provided at 306 coaxially with the lever 305. 308 is the winding up shaft of the winding up lever not shown in the drawing, whereby on the end face of this winding up shaft 308 the winding up cam 309 is fixed. 310 is a rotatable intermediary lever, whereby the pin 310a provided on the one end of this intermediary lever 310 is engaged with the winding up cam 309. Further, on the other end of the intermediary lever 310 a pin 310b is provided in such a manner that the pin 310b is engaged with the one end of the intermediary lever 307 and at the same time with the one end 311a of the mirror driving lever 311. Further by means of the pin 310c provided on the intermediary lever 310 the first holding lever 313 is charged. Further the other end of this intermediary lever 307 is so designed as to be engageable with a pin 312a provided at the one end of the rotatable charge lever 312. This charge lever 312 is urged by means of the spring 312d along the counter clockwise direction. $Mg_1$ is the first holding magnet with a permanent magnet being engaged with the one end 313a of the first holding lever 313, while the other end 313b of the first holding lever 313 is engaged with the one end 314a of the release lever 314 through the spring 313c. Further by means of the rotation of the pin 310c provided on the intermediary lever the one end of the first holding lever 313 engages with the cam face 313d. At the one end of the release lever 314 a pin 314b is provided, whereby the other end 315a of the mirror driving engagement lever 315, whose one end is engaged with the one side 311c of the mirror driving lever 311, is kept by the pin 314b. Further the one end of the rotatable EE holding lever 316 as well as the pin 312b provided on the charge lever 312 is kept by means of the ends 314d and 314e of the release lever 314. This release lever 314 is urged by means of the spring 314f along the counter clockwise direction. 318 is the EE sector gear being kept at the other end of the above mentioned holding lever 316. With this sector gear the gears 319a and 319b and the stop wheel 319c forming a speed adjusting mechanism 319 are engaged. Further, the sector gear 318 is provided with the slide member $Ra_1$ of the pulse producing switching means $Ra$ for determining the preset aperture value. On the shaft 318a of this sector gear 318 a gear 320 is mounted so as to be engaged with the EE charge gear 321. On this gear 321, a lever 327 is fixed coaxially so as to be in contact with the other stepped part 312e of the above mentioned charge lever 312. The above mentioned sector gear 318 is provided with the pin 318b whose end face is fixed on the signal lever 329 provided on the support lever 328. The folded end of this signal lever 329 holds the arm 303c of the above mentioned aperture preset ring 303. The above mentioned EE sector gear 318 is strongly urged by means of the spring along the clockwise direction against the force of the spring 318c urged on the sector gear 318 along the counter clockwise direction.

$Mg_2$ is an aperture control magnet with a permanent magnet, so designed as to attract the iron piece 331 mounted on the lever 330 to be attracted. This lever 330 to be attracted is urged along the counter clockwise direction by means of the spring 331a, whereby the one folded end of the lever 330 is engageable with the stop wheel 319c of the above mentioned speed adjusting mechanism 319. Further, with the other end of the lever to be attracted 330 the other branched end 312f of the charge lever 312 is in contact. The above mentioned mirror driving lever 311 presents a delay device not shown in the drawings, being urged by means of the spring 311d along the counter clockwise direction, while the one end of the mirror driving lever 311 is kept by the other side of the above mentioned mirror driving engagement lever 315. The front shutter plane holding lever 333 is urged by means of the spring 333a along the counter clockwise direction, whereby the one end of the lever 333 is engaged with the pin 334a provided on the front shutter gear 334 while the other end is in a position to be attracted by the shutter control magnet $Mg_3$ with a permanent magnet. This front shutter plane gear 334 is engaged with the pinion 335 of the front shutter plane drum not shown in the drawing.

At the holding part 311b of the above mentioned mirror driving lever 311 the mirror holding lever 336 is held. This holding lever 336 is urged along the counter clockwise direction by means of the spring 336 provided between the lever 336 and the mirror driving lever 311, whereby the one end of the lever 336 is engaged with the push up lever 337 coaxially born on the mirror driving lever 311.

The one end 337a of the push up lever 337 is rotated along the clockwise direction by the mirror lifting operation in such a manner that the mirror can be lifted up alone. At the other end of this push up lever 337 a push up pin 338a provided on the mirror 338 is held. This mirror is so designed as to be rotated around the mirror shaft 338b. 338c is the spring for returning the mirror. 338 is the rear shutter plane gear provided separately but coaxially with the front shutter plane gear 334, whereby this rear shutter plane gear 339 is engaged with the rear shutter plane pinion 500 for the rear shutter plane drum not shown in the drawing. Further on the rear shutter plane gear 339 a pin 339a is provided. 340 is the lever to be attracted which is rotated by means of the above mentioned pin 339a, being so designed as to be attracted by means of the shutter control magnet $Mg_4$ with a permanent magnet through the iron piece 340a. This lever 340 to be attracted is normally urged by means of the spring 340b so as to be rotated up to the magnet $Mg_4$ and held there. 341 is the rear shutter plane signal lever to be rotated by means of the above mentioned pin 339a, being normally urged by means of the spring 341a up to the position of the holding pin 341b. The end 336b of the above mentioned mirror holding lever 336 and the above mentioned rear shutter plane signal lever 341 are held. Further, the light beam having passed through the photographic lens not shown in the drawing is observed by the photographer at the eye piece through the mirror 338, the focal plane 342, the condenser lens 343 and the pentagonal prism 344.

346 is a light sensing element such as a silicone blue cell. 340 is the shutter button including a first release switch $SR_1$.

Figure 2A:
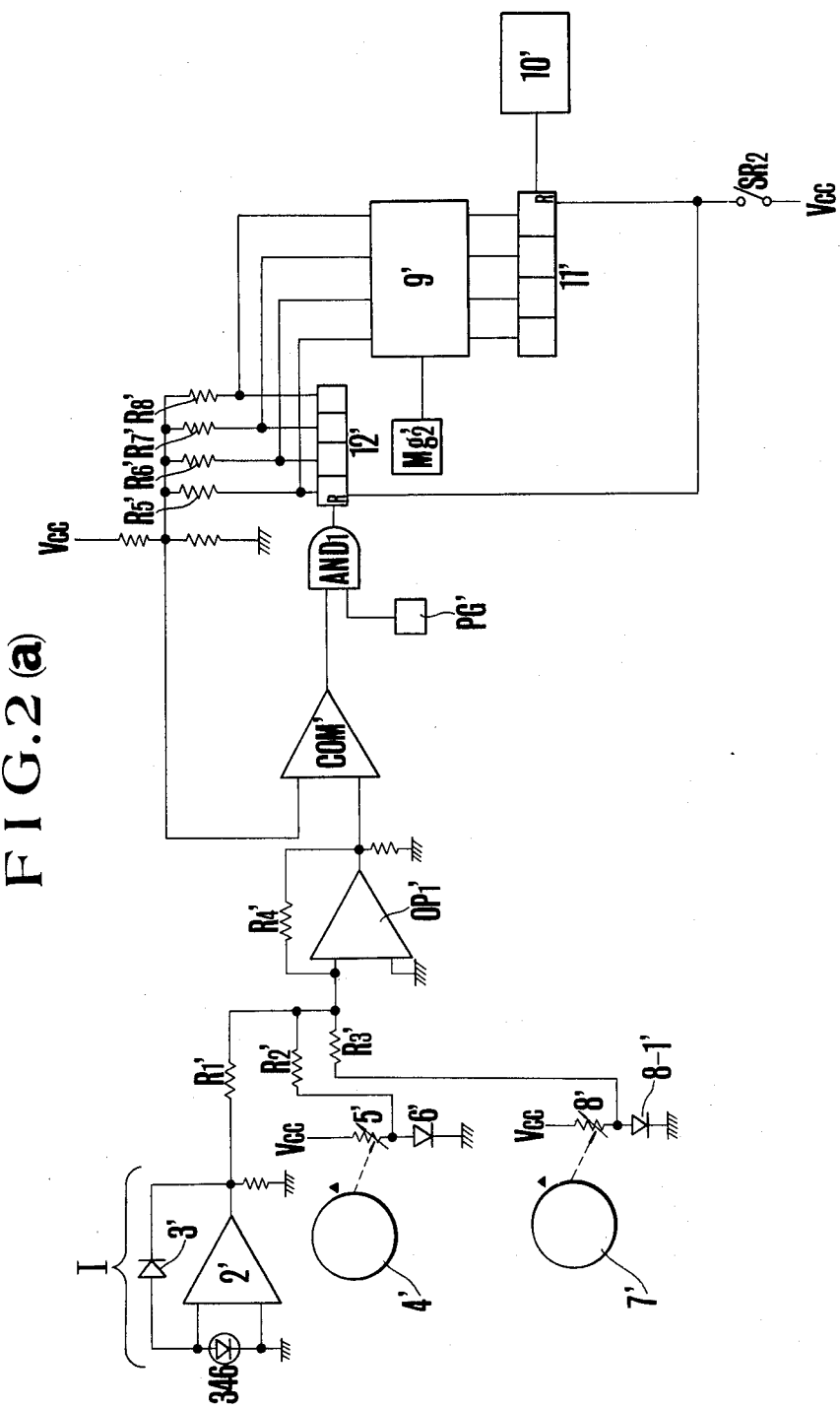
FIG. 2(a) shows an embodiment of the circuit of the aperture control part of a camera in which the counter circuit in accordance with the present invention is applied.
Figure 2B:
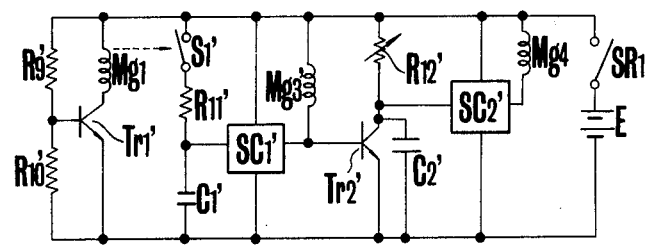
FIG. 2(b) shows an embodiment of the circuit for driving the mechanism of the camera shown in FIG. 1.

FIG. 2(a) shows an embodiment of the circuit of the aperture control part of a camera in which the counter circuit in accordance with the present invention is applied, whereby I is a light measuring part consisting of a light sensing element 346 such as silicon photocell, the operation amplifier 2' and a diode 3' for measuring the brightness of the object to be photographed and compressing the measured brightness in a logarithmical way. 4' is the ASA sensitivity setting dial, 5' a variable resistance mechanically engaged with the dial 4 so as to be set at the resistance value corresponding to the ASA sensitivity set by means of the ASA sensitivity setting dial. 6' is a diode, 7' the shutter speed setting dial and 8' the variable resistance which assumes a value corresponding to the shutter speed set by means of the shutter speed setting dial. 8-1' is a diode, $R_1'$ - $R_3'$ the operation resistances, OR' the operation amplifier, $R_4'$ the feed back resistance, COM' the comparator, PG' the clock pulse oscillator, $AND_1$ the AND gate, 12' the 4-bit binary counter, and $R_5'$ - $R_8'$ the resistances connected with respective output terminals of the Flip-Flop composing the binary counter whereby the resistances have respective weights. The above mentioned elements COM', PG', $AND_1$, 12', and $R_5'$ - $R_8'$ compose an analog-to-digital converter of the following comparison type. 10 is the counter circuit in accordance with the present invention whose detailed compositions are to be explained later. 11' is the 4-bit binary counter, 9' the coincidence detection circuit and $Mg'_2$ the magnet driving circuit including the above mentioned magnet $Mg_2$. FIG. 2(b) is the circuit for driving the camera shown in FIG. 1, whereby $SR_1$ is the switch $SR_1$ shown in FIG. 1, $R_9'$ and $R_{10}'$ the voltage dividing resistances, $Tr_1'$ the transistor, $Mg_1$ the magnet shown in FIG. 1, and $S_1'$ the normally opened switch to be closed in functional engagement of $Mg_1$. $R_1'$ and $C_1'$ are the resistance and the condenser for composing a time constant circuit, whose time constant is set at a value corresponding to the time for controlling the aperture with the excited $Mg_2$ or to the time until the determination of the mirror lifting operation. $SC_1'$ is the switching circuit of the Schmidt-Trigger circuit and so on, $Mg_3$ the magnet shown in FIG. 1, $Tr_2'$ a transistor, $R_{12}'$ a variable resistance whose value is changed in functional engagement with the above mentioned shutter speed setting dial 7', $C_2'$ a condenser, $SC_2'$ the switching circuit for the Schmidt-Trigger or the like, $Mg'_4$ the magnet shown in FIG. 1 and E the current source. $SR_2$ is closed by means of the above switch, whereby the counter 11' and 12' are reset.

Figure 3A:
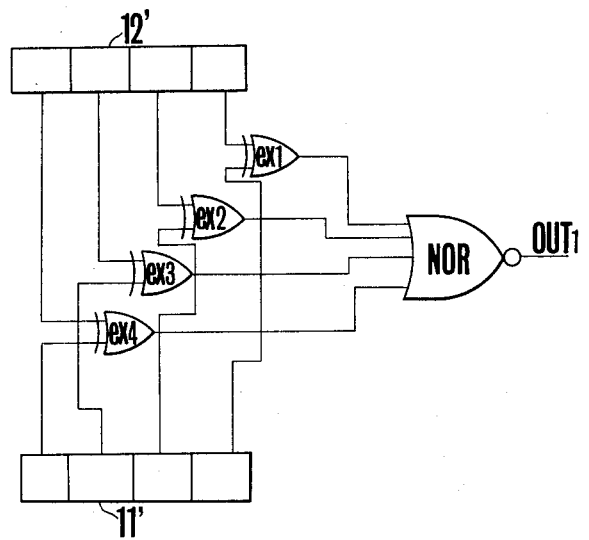
FIG. 3(a) shows an embodiment of the coincidence shown in FIG. 2(a).
Figure 3B:
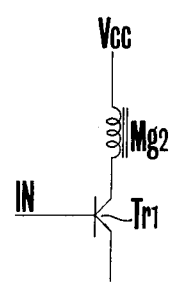
FIG. 3(b) shows an embodiment of the circuit $Mg'_2$ shown in FIG. 2(a).

FIG. 3(a) shows an embodiment of the coincidence detection circuit 9' shown in FIG. 2(a), whereby the circuit consists of the exclusive OR circuits $ex_1$ - $ex_4$ and the NOR circuit NOR. FIG. 3(b) shows an embodiment of the circuit $Mg'_2$ shown in FIG. 2(a), whereby the circuit consists of the transistor $Tr_1$ and the magnet $Mg_2$, while the base of the transistor $Tr_1$ is connected to the output terminal of the coincidence detection circuit 9'.

Figure 4:
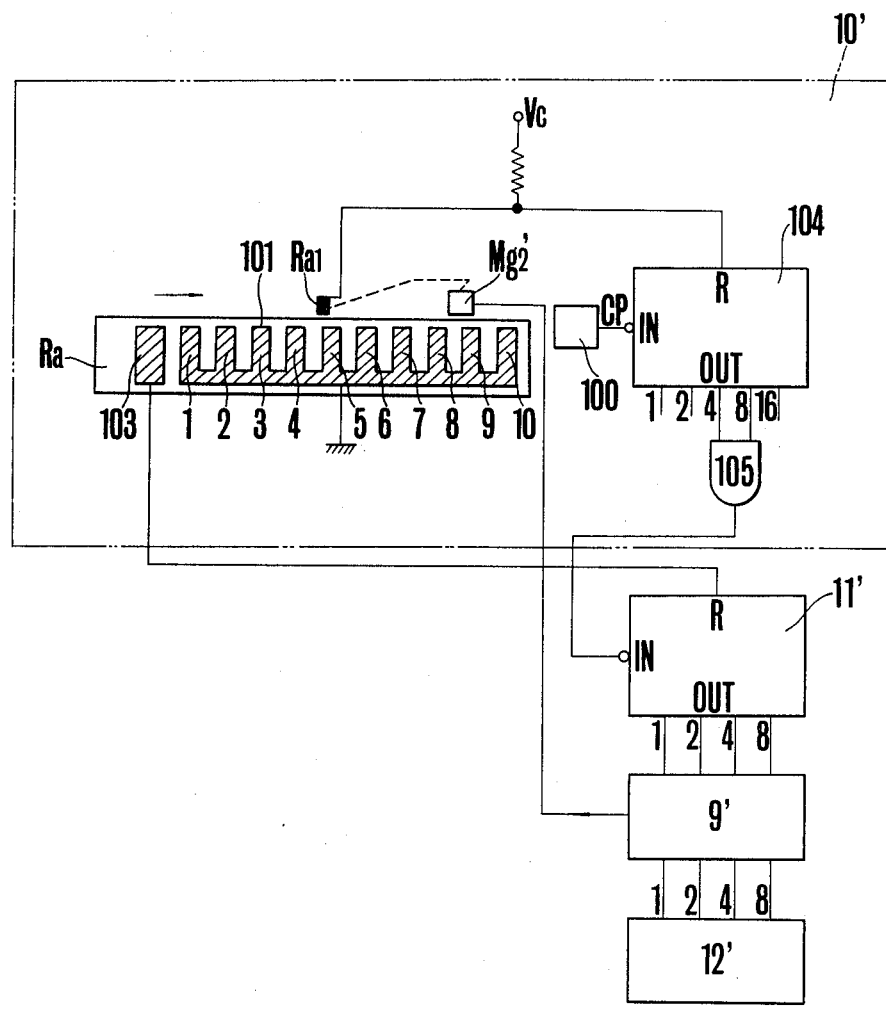
FIG. 4 shows an embodiment of the counter circuit in accordance with the present invention.

FIG. 4 shows an embodiment of the counter device in accordance with the present invention, whereby the mechanism and the circuit elements shown in FIGS. 1 and 2 present the same figures. In the drawing, 101 is the comb tooth shaped conductor pattern consisting of metal coatings on the above mentioned switching means (insulation base plate) shown in FIG. 1. $Ra_1$ is the slide brush shown in FIG. 1 to be slided along the direction of the arrow.

By means of the contact with the pattern with the brush the pulse signal is produced. 103 is the pattern provided at the one end of the pattern 101 so as to produce the start signal, whereby the brush $Ra_1$ starts from that position and moves sliding on the pattern 101 with a constant speed. 104 is the first binary counter whose input terminal IN is normally supplied with the clock pulses CP with a constant frequency from the pulse generator 100. The reset input terminal R of the first counter 104 is supplied with pulse signal from the slide brush $Ra_1$, whereby out of the outputs of the counter 104 the third and the fourth bit with the weight 4 and 8 is supplied to the AND gate 105. The output pulse of the gate 105 is supplied to the input terminal IN of the second binary counter 11'. The reset input terminal R of the counter 106 is supplied with the start signal from the start pattern 103 provided at the start position of the comb tooth shaped pattern. The outputs 1, 2, 4 and 8 of the second counter 11' are supplied to the one input terminal of the coincidence detection circuit 9', whose other terminal is supplied with the exposure value operated as mentioned above or the preset exposure value as digital signal from the counter 12'. 9' is the coincidence detection circuit which produces a pulse signal at the output terminal at the time point at which the signal from 11' coincides with that from 12'. Thus produced pulse signal serves as the stop signal of the brush sliding for stopping the brush sliding on the comb tooth shaped pattern.

Hereby the reset terminal R of the counter 104 is supplied with a voltage Vc when the brush $Ra_1$ is not in contact with the comb tooth shaped pattern in such a manner that the counter 104 is reset. Further, the reset terminal 11' of the counter 11' is supplied with a voltage Vc when the brush $Ra_1$ is in contact with the pattern 103 in such a manner that the counter 11' is reset.

Figure 5:
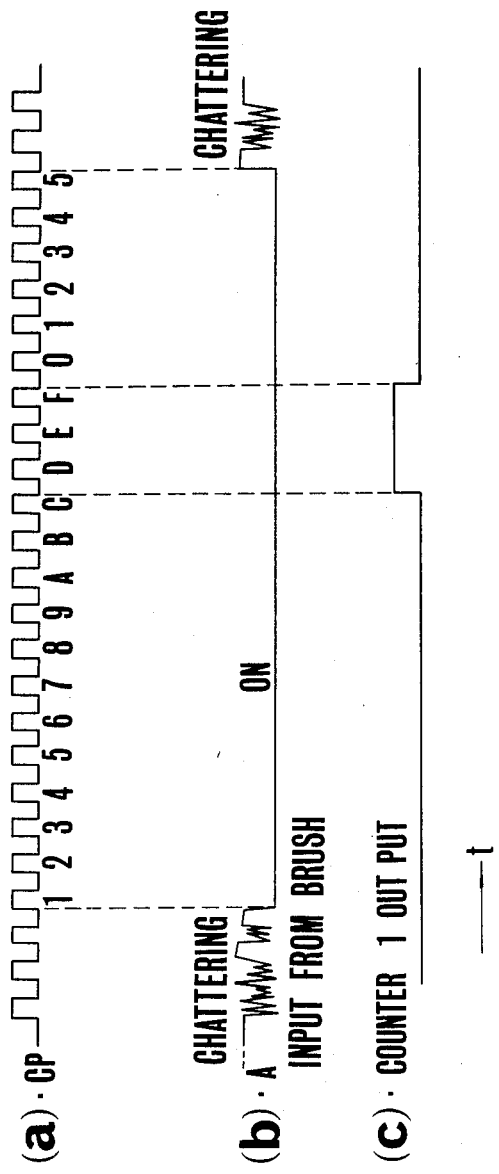
FIG. 5 shows timing charts for explaining the operation of the circuit shown in FIG. 4.

FIG. 5 shows timing chart for explaining the operation of the circuit shown in FIG. 4.

Below the operation of the counter circuit in accordance with the present invention will be explained in accordance with FIGS. 1 to 3.

At the time of taking a photograph the EE index of the aperture ring 301 is set so as to coincide with the index 302, while the desired shutter speed and the ASA sensitivity are set at the shutter speed setting dial 7' and the ASA sensitivity setting dial 4' shown in FIG. 2(a). In functional engagement with the operations the variable resistance 5' and 8' and $R_{12}'$ shown in FIG. 2(b) respectively assume the value corresponding to the set shutter speed and the ASA sensitivity. When then the current source button not shown in the drawing is operated, the aperture control circuit shown in FIG. 2(a) is brought into the operation state. Thus the output of the light measuring circuit I assumes a voltage corresponding to the brightness, while the voltages corresponding to the set ASA sensitivity and to the shutter speed are produced at the voltage dividing point of the variable resistance 5' and the diode 6' and at the voltage dividing point of 8' and 8-1', so as to be applied to the operation amplifier $OP_1'$, whose output assumes a voltage of the sum of the outputs, i.e. Av = Bv + Sv − Tv. At this time, the pulse oscillator PG' is in operation in synchronization with the operation of the above mentioned current source button so that the pulses are put in the counter through the AND gate $AND_1$ so as to be counted in a binary way. The digital value counted by the counter 12' in a binary way is converted into an analog value by means of the resistance $R_5'$ - $R_8'$ so as to be put in the one input terminal of the comparator COM' and to be compared with the voltage corresponding to Av there. When the both voltages put in the COM' coincide with each other during the operation of the comparison, the comparator COM' is inversed and the logic "0" is produced so that $AND_1$ is closed while the counter 12' stops the counting of the pulses from PG' in such a manner that the A - D conversion operation is terminated. Thus a digital value corresponding to the aperture value in accordance with the brightness is stored in the counter 12'.

When then the shutter button 347 is pushed down, the first release switch $SR_1$ is closed so as to being the transistor $Tr_1'$ in the switched on state in such a manner that a current flows through the first holding magnet $Mg_1$ with a permanent magnet so as to excite $Mg_1$ in a reversed direction and to compensate the magnetic force. Thus the first holding lever 313 is rotated along the clockwise direction by means of the spring 313c. Namely the engagement of the one end of the first holding lever 313 with the one end 314a of the release lever 314 is solved so that the release lever 314 is rotated along the counter clockwise direction by means of the spring 314f.

By means of the rotation of the release lever 314 along the counter clockwise direction the holding lever 316 is rotated along the counter clockwise direction so as to be disengaged from the sector gear 318. Further, the rotation of the sector gear 318 induces the signal lever to move downwards through the pin 318b, in such a manner that the preset ring 303 whose arm 303c is kept by the signal lever 329 induces the sector gear 318 to rotate along the clockwise direction against the force of the spring 318c through the spring 303a. Thus the gears 319a, 319b and 319c forming a speed adjusting mechanism 319 rotates in such a manner that the stop wheel in the last step is rotated along the counter clockwise direction. Further by means of the rotation of the sector gear 318 the slide brush $Ra_1$ of the switching means Ra for generating pulses is moved in such a manner that the counter circuit shown in FIG. 4 starts to count whereby the pulses whose number corresponds with the number of the contacts of the brush $Ra_1$ with the comb tooth shaped pattern is counted and stored in the counter and transferred to the coincidence detection circuit 9'.

On the other hand, a digital value corresponding to Av is put in the counter 12' as mentioned above in such a manner that the coincidence detection circuit 9' detects the coincidence of the content of the counter 12' with that of the counter 11', whereby when both contents coincides with each other the NOR in FIG. 3 produces an output so as to bring the $Tv_1$ in FIG. 3(b) into the switched on state and to allow the passage of the current through $Mg_2$, exciting $Mg_2$ along the reversed direction so as to free the iron piece 331. Thus the lever to be attracted 330 is rotated along the counter clockwise direction by means of the spring 331a whereby the folded part is engaged with the stop wheel 319c so as to stop the rotation of the stop wheel 319c. Thus the position of the sector gear 318 is determined in accordance with the digital value stored in the counter 12'. Consequently when the sector gear 318 stops rotation, the aperture preset ring 303 is rotated up to the position corresponding to the proper aperture value whereby the position of the bell crank is determined. In other words, the position at which the aperture preset ring 303 stops corresponds with the aperture value determined by the information from the light sensing element 346 for measuring the light beam coming through the photographic lens, the set shutter speed and the film sensitivity exposure compensation information.

On the other hand, with the start of such EE operation the automatic aperture mechanism also starts to operate. Namely when $Mg_1$ is excited in the reversed direction the first holding lever 313 is rotated along the clockwise direction by means of the spring 313c, whereby by means of the rotation of the release lever 314 along the counter clockwise direction the end 315a of the mirror driving engagement lever 315 is rotated along the counter clockwise direction through the pin 314b. Namely the engagement of the one side 311c of the mirror driving lever 311 with the one end 315b of the mirror driving engagement lever 315 is solved so that the mirror driving lever 311 is rotated along the counter clockwise direction by means of a spring 311d. At the same time, the claw part 311b of the mirror driving lever 311 is kept by the holding lever 336 so that the push up lever 337 bearing the holding lever 336 is rotated along the counter clockwise direction. Thus by means of the folded part 337b of the push up lever 337 in engagement with the rising up part 305c of the automatic aperture lever 305 the automatic aperture lever 305 is rotated along the clockwise direction. Thus by operating the pin 304 provided on the aperture driving ring the diaphragm is closed down to the position of the above mentioned preset bell crank. Further, by the rotation of the push up lever 337 along the counter clockwise direction the push up pin 338a of the mirror is pushed up so as to lift the mirror 338.

The time from the closure of the diaphragm till the lift up of the mirror corresponds with the time constant of the time constant circuit consisting of $R_{11}'$ and $C_1'$ from the closure of the switch $S_1'$ in functional engagement with the excitation of $Mg_1$ along the reversed direction. After the elapse of the above mentioned time, a current flows through $Mg_3$, which is thus excited along the reversed direction, whereby by means of a pin 334a on the front shutter gear 334 rotated along the counter clockwise direction by means of a spring not shown in the drawing the front shutter holding lever 333 is rotated along the clockwise direction. Thus the front shutter gear 334 starts to rotate allowing the front shutter plane to start to run through the front shutter pinion. Further at this time, the base potential of the transistor $Tr_2'$ goes down, so that $Tr_2'$ is brought into the switch off state, whereby after the elapse of the time corresponding to the value of the resistance $R_{12}'$, namely the set shutter speed a current flows through $Mg_4$, so as to excite $Mg_4$ along the reversed direction. Hereby the locking of the rear shutter plane gear 339 by means of the lever to be attracted 340 is solved so that the rear shutter plane gear 339 starts to rotate so as to allow the rear shutter plane to start to run through the rear shutter plane pinion 500. At this time, the switch $SR_2$ is closed instantly so as to reset the counters 11' and 12'.

In this way, the aperture value is determined, the shutter is controlled and a photograph is taken, whereby the slide brush $Ra_1$ starts to move in such a manner that the pulses produced by the contact of the brush $Ra_1$ with the comb tooth shaped pattern are counted by the counter 11'.

Below the operation of the counter 11' will be explained in detail. When as mentioned above the brush $Ra_1$ starts to move, the counters 11' and 104 are in the reset state because the brush $Ra_1$ is not in contact with the pattern 103 at the initial state, so that the counter 104 has not yet started the counting.

When in the above mentioned state, the brush $Ra_1$ further moves so as to be in contact with the comb tooth shaped pattern 1, a logic "0" is put in the reset put in terminal of the counter 104 so as to set the counter 104, which starts counting the clock pulses put in the input terminal IN from the pulse generator 100 operated in synchronization of the operation of the current source button not shown in the drawing. When in this way, the counter 104 has counted 12 pulses, the logic of the output of the bits with the weight "4" and "8" becomes "1" so that the AND gate 105 is closed during the count 12 to 15 as is shown in FIG. 5(c), whereby the output pulse as is shown in FIG. 5(c) is sent to the input terminal IN of the second counter 11' from the gate 105. When in this way, the first counter is reset and set repeatedly (due to the contact of the brush with the comb tooth shaped pattern), the output pulse shown in FIG. 5(c) corresponding to the number of the contacts of the brush with the pattern is put in the second pattern. The second counter counts this input and produces the binary signal (1, 2, 4, 8) at the output terminal. When the number of the contacts of the brush with the pattern is counted in case of the counter circuit in accordance with the present invention, the pulse produced by the contact of the brush with the pattern is not counted but the pulses are produced after the brush has been in a complete contact with the pattern after the elapse of a certain determined time in such a manner that the produced pulses are counted by the counter 11' so that even if chattering takes place at the time of the contact of the brush with the pattern as is shown in FIG. 5, the pulses to be put in the counter 11' is free from the wave form out of order due to the chattering in such a manner that the number of the contact of the brush with the pattern can be counted with high accuracy. Thus the rotation amount of the above mentioned sector gear 318 corresponds with the pulse numbers counted quite free from the influence of the chattering so that the exposure can be carried out exactly.

Figure 6:
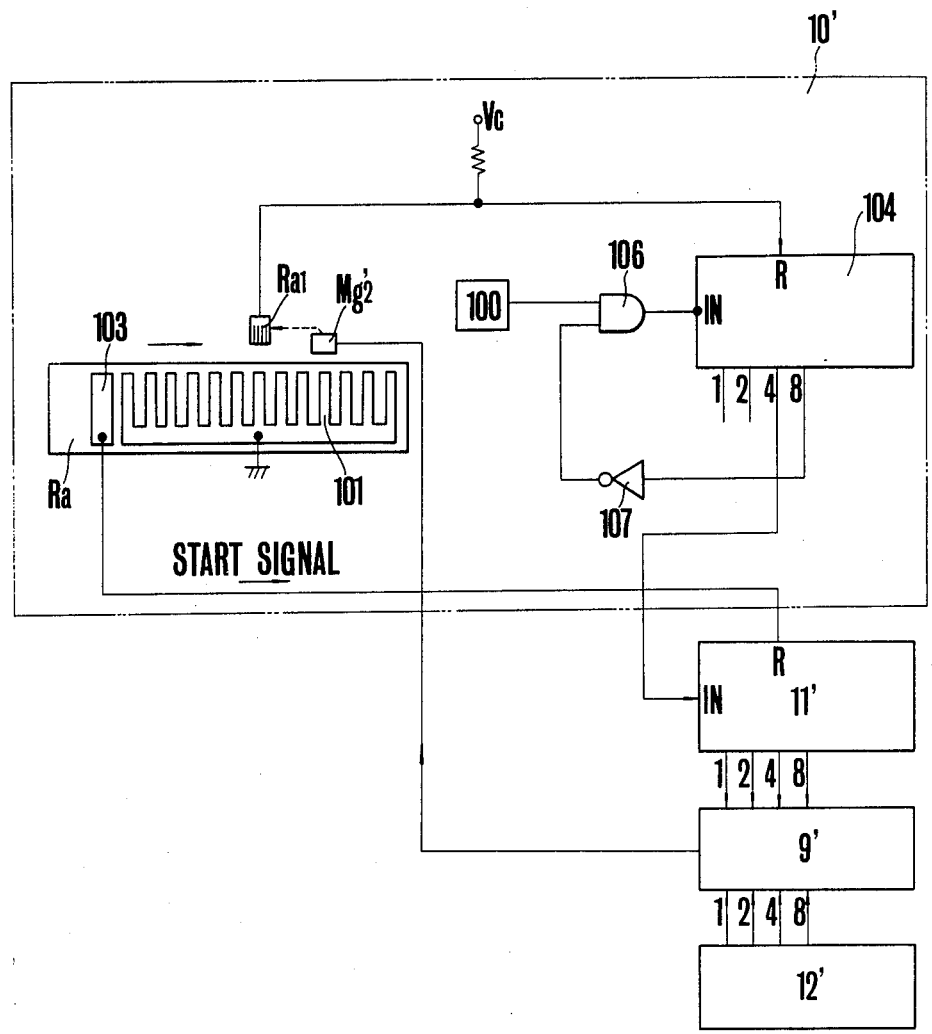
FIG. 6 shows another embodiment of the counter circuit in accordance with the present invention.
Figure 7:
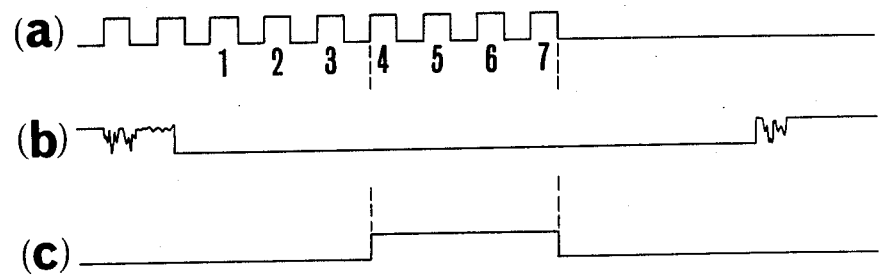
FIG. 7 shows timing charts for explaining the operation of the circuit shown in FIG. 6.

FIG. 6 shows another embodiment of the counter circuit in accordance with the present invention, whereby the same elements as those shown in FIG. 4 presents the same figures. The difference between both embodiments is that the output terminal of the bit with the weight "8," of the binary counter 104 is connected to the one input terminal of the AND gate 106 through the inverter 107 while the output terminal of the bit with the weight "4" is connected to the input terminal IN of the counter 11'. FIG. 7 shows the timing charts for explaining the operation of the circuit shown in FIG. 6. Below the explanation will be made in accordance with FIG. 7. Now let us suppose that a digital value corresponding to the aperture value is put in the counter 12' in the same way as in case of the above mentioned embodiment while the brush $Ra_1$ starts to slide in such a state. When now the brush $Ra_1$ comes in contact with the comb tooth 1 of the comb tooth shaped pattern a logic "0" is put in the reset terminal R of the counter 104, so that the pulses from the pulse generator 100 is put in the counter 104 through the AND gate 106 in such a manner that the counter 104 starts the counting in a binary way. Thus, when 4 pulses are put in the counter 104 as is shown in FIG. 7(a) after the brush $Ra_1$ has come in contact with the comb tooth 1, the bit with the weight "4" of the counter 104 produces an output. This output is kept until 8 pulses are counted by the counter 104, so that they are converted into a single pulse as is shown in FIG. 7(c) so as to be put in the counter 11' and counted there. Further, when the 8th pulse is put in the counter 104 the bit with the weight "8" produces an output, which is inversed by means of the inverter 107 so as to be transferred to the AND gate 106 so as to close the gate 106, whereby the counting is not carried out any more. The reason why the counting by the counter 104 is stopped after the single pulse is put in the counter 11' is to eliminate the misoperation due to the countings by the counter more than twice when the slide speed of the brush is too slow as compared with the period of the clock pulses.

As mentioned above, a single pulse is counted by the counter 11' in accordance with the contact state of the brush $Ra_1$ with the comb tooth 1 and the brush $Ra_1$ goes out of the contact with the comb tooth shaped pattern in such a manner that the counter 104 is reset. When then the brush comes into contact with the comb tooth 2 for the next time, the same operation as mentioned above is repeated so as to put a single pulse in the counter 11'. Namely the pulses whose number corresponds with that of the contacts of the brush $Ra_1$ with the comb tooth shaped pattern are counted by the counter 11' in a binary way in such a manner that when the content of the counter 12' coincides with that of the counter 11' an output is produced by 9' so that the aperture control operation stops whereby the aperture value corresponds with the digital value put in the counter 12'. Even if also in the present embodiment a chattering takes place at the time of the contact of the brush with the pattern the influence of the chattering can completely be eliminated because a single pulse is produced for counting when the brush comes in a complete contact with the pattern.

Figure 8:
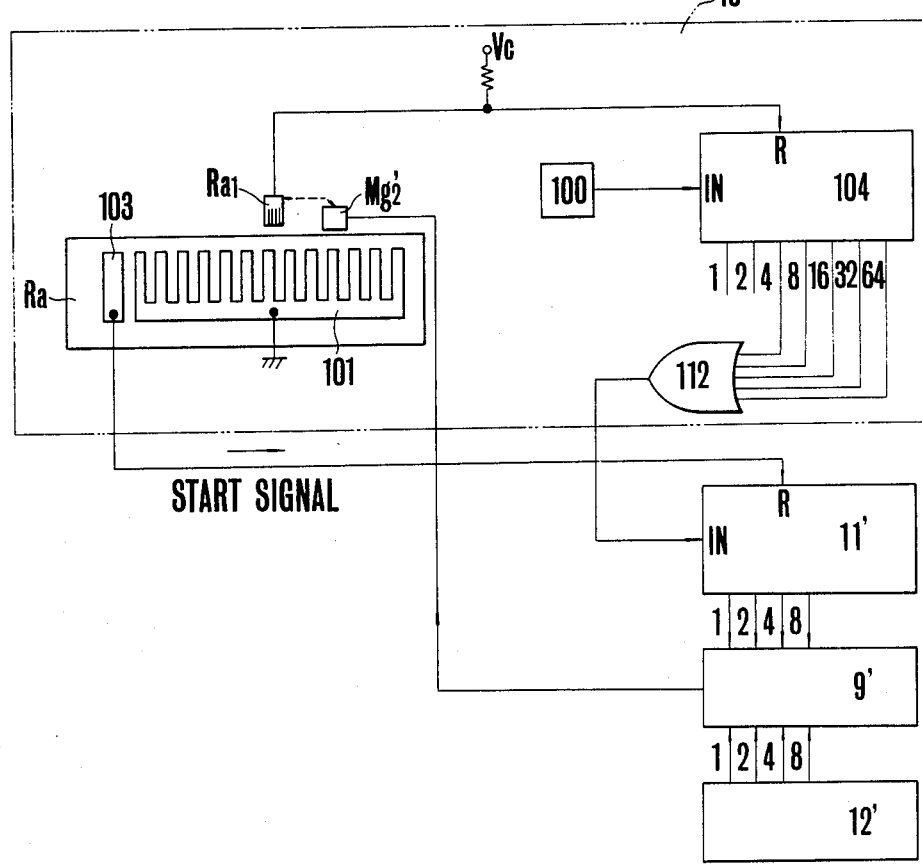
FIG. 8 shows further another embodiment of the counter circuit in accordance with the present invention.

FIG. 8 shows further another embodiment of the counter circuit in accordance with the present invention. In the drawing the same elements as those shown in FIG. 4 present the same figure. In case of the embodiment shown in FIG. 8 as the first counter 104 for example, a 7 bit binary counter is used, whereby out of its outputs only those more than (4) are put in the second binary counter 11' through the OR gate 112. In order to eliminate the influence of the chattering, in the same way as in case of the circuit shown in FIG. 4 the outputs of the counters 1 and 2 are not used whereby the input signal to the second counter 11' consists of all the outputs of the counters after 4. By making use of a multi-bit counter such as 7 bit counter the brush goes out of the contact with the pattern during one cource of the counting of the clock pulses by means of the counter even when the slide speed of the brush is remarkably slow so that the counter 104 is cleared by means of the signal from the brush in such a manner that the output signal of the counter 104 assumes a number corresponding to that of the contacts of the brush with the pattern.

The composition and the operation of the circuit shown in FIG. 8 are similar to those of the embodiment in accordance with FIG. 4 so that the explanation is omitted here.

Figure 9:
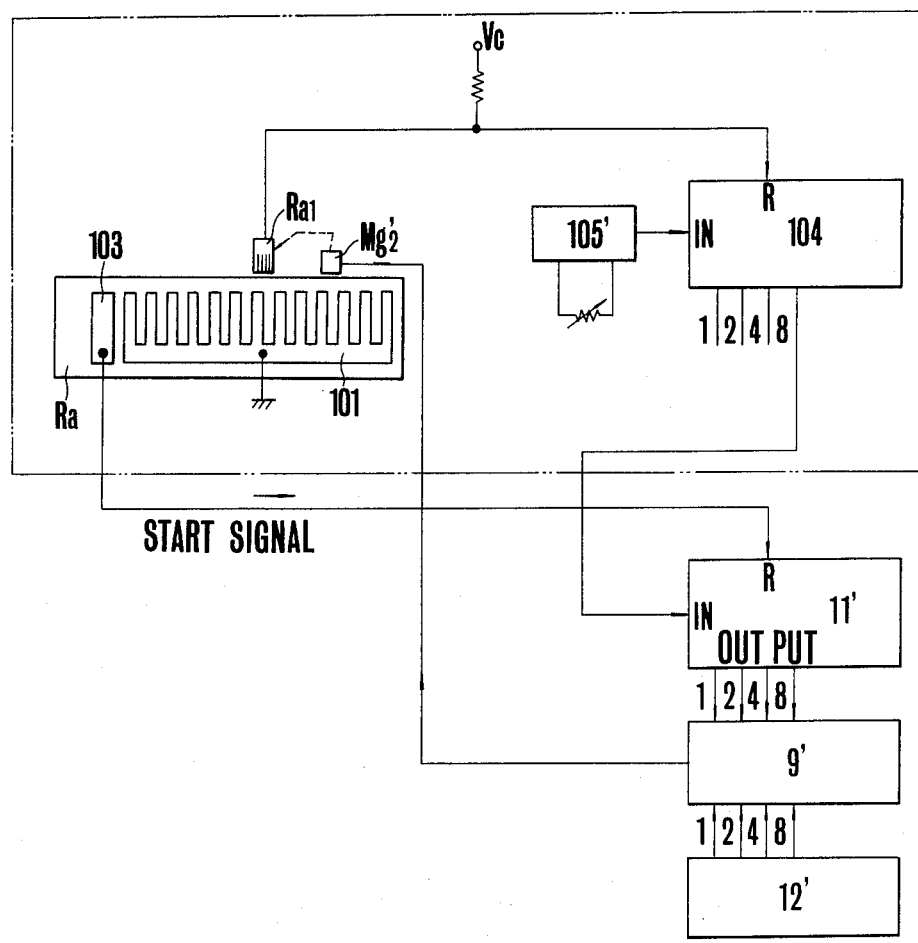
FIG. 9 shows further another embodiment of the counter circuit in accordance with the present invention.

FIG. 9 shows further another embodiment of the counter circuit in accordance with the present invention.

FIG. 10 shows timing charts for explaining the operation of the circuit shown in FIG. 9. In the drawing, the same elements as those shown in FIG. 4 present the same figures. In the present embodiment as the clock pulse generator 105' a variable frequency generator is used while as the first counter 104 a 4 bit counter is used whereby the output of the bit 8 is put in the IN terminal of the second counter 11'. The operation of the present circuit is as follows. By varying the frequency of the clock pulses shown in FIG. 10(a) in accordance with the slide speed of the brush the 8th and the 15th pulse put in the 4 bit counter are counted so as to form the input signal to the second counter 11'. In case in this way the frequency of the clock pulses is varied in accordance with the slide speed of the brush, one output signal of 104 is obtained for one contact no matter whether the brush speed is too quick or too slow so that the misoperation can be completely avoided. FIG. 10(b) shows the case the slide speed of the brush is most high, whereby the signal (C) is formed only with the output of the bit with the weight 8 and the frequency of the pulse is chosen sufficiently high in such a manner that the counter is cleared only after the pulses after the 9th in pulse are put in the counter. Further FIG. 10(d) shows the case the slide speed of the brush is most low, whereby frequency of the pulse is determined in such a manner that the frequency of the clock pulse becomes slow and it is so designed that the brush goes out of the contact with the pattern after the 9th impulse is put in the counter in the same way as in the above mentioned case. Further the frequency of the pulse is determined by the slide speed of the brush in order that the counting can not be carried out repeatedly by the counter 104 during the contact of the brush with the same comb tooth.

FIG. 11 shows a plane view (a) of an embodiment of the comb tooth shaped pattern to be applied to the counter circuit in accordance with the present invention, and a diagram (b) of the slide characteristics of the brush. In the drawing, 101 is the comb tooth shaped pattern, $Ra_1$ the slide brush, 103 the pattern for the start position signal, 112 the common return route pattern, 113 the insulated base plate and 114 and 115 the conductors of the patterns. These patterns 101, 103 and 112 are fixed on the insulated base 103 by means of metallizing or the like, whereby the slide brush $Ra_1$ slides over those patterns for the start position S toward the right at the constantly accelerated speed as is shown in FIG. 11(b). 103 is the start pattern independently provided at the slide start position of the brush, so as to obtain the start position signal to clear the second counter 11' and to serve to avoid the wear of the first pattern of the comb tooth shaped pattern 101. 112 is the common return route pattern provided parallel to the comb tooth shaped pattern 101 whereby the conductor 114 of the pattern 101 is provided at the end of 101 quite opposite to that of 112 at which the conductor 115 is provided in order that the change of the resistance value in the patterns due to the slide position can be avoided. In the drawing P and Q are the width of the conductors along the sliding direction of the comb tooth shaped patterns and are changed in accordance with the brush speed shown in FIG. 11(b). Further 1' - 10' in FIG. 11(a) are the stop positions in case the slide speed of the slide brush is disregarded, while 1 - 10 are the corrected positions of the comb tooth as is shown by R. U. V. This is to compensate the time delay such as of the magnet for stopping the brush or other driving mechanism.

Now let up suppose as to FIG. 11(b), the acceleration of the brush constantly accelerated be $\alpha$, the distance from the start position up to the position at which the brush stops sliding after the pulse generation be S', the then time delay be T, the distance from the start position up to the position at which the pulse is generated be S, the time from the start up to the production of the pulse be $t$, the distance between the adjacent stop position be $l$ and the number of the stop positions be $n$, so the position S at which the pulse is generated can be expressed as $$S = \tfrac{1}{2} \alpha t^2 \qquad (1)$$

while the position S' at which the brush actually stops can be expressed as $$S' = \tfrac{1}{2} \alpha (t - T)^2 \qquad (2)$$

The distance to be corrected is obtained by subtracting (1) from (2). Namely the distance $\Delta S$ to be corrected can be expressed as $$\Delta S = S' - S = \tfrac{1}{2} \alpha (2tT + T^2) \qquad (3)$$

$t$ is put out of (3) by means of the relation $$S' = nl = \tfrac{1}{2} \alpha (2tT + T^2)$$

Thus, $$\Delta S = T \sqrt{2n\alpha l} - \tfrac{1}{2} \alpha T^2 \qquad (4)$$

In (4) $l$ is constant, so that by obtaining the distance to be corrected due to the delay by means of calculating R, U, V, ... shown in the drawing in accordance with $n$, $\alpha$, T the form of the comb tooth shaped pattern can be decided. Hereby beyond $m'$ shown in FIG. 11(b) the slide movement is at a constant speed so that the distances between the adjacent patterns therefore are equal.

If as is shown in FIG. 11, the width of a comb tooth of the comb tooth shaped pattern is gradually increased toward the right in accordance with the slide speed of the brush in the ternal in which the brush is constantly accelerated and is kept constant in the internal in which the brush slides at a constant speed, the time of the contact of the brush with each comb tooth becomes always equal, so that even if the embodiment shown in FIG. 4 is used, the number of the pulses put in the counter 104 during the contact of the brush with the comb tooth is always constant, whereby when the bit number is determined in advance in the counter it is avoided that the counting be repeated during the contact of the brush with the same comb tooth.

FIG. 12 shows the contact situation among the comb tooth shaped conductor pattern 101, the common return route pattern 112 and the slide brush $Ra_1$ in perspective view. In case of the arrangement shown in FIGS. 11 and 12(a), a slide brush with a simple construction as is shown in FIG. 12(a) can be applied. On the other hand, in case of the arrangement shown in FIG. 12(b), it is necessary to use a slide brush with the construction as shown in FIG. 12, whereby the slide brush becomes unavoidably at higher cost.

As explained so far in case of the counter circuit in accordance with the present invention the clock pulses are counted by the first counter during the contact of the brush with the conductor until the counted value reaches a certain determined value whereby the output signal of the first counter is put in the second counter so as to be counted there. Consequently even if a chattering takes place during the contact of the brush with the conductor the influence of the chattering upon the pulses can be avoided because the pulses are not counted directly but upon the complete contact of the brush with the conductor after a certain determined time the output of the first counter is produced so as to be counted by the second counter, while the counter circuit preventing the chattering consists of digital circuits so that the circuit can be integrated as one body with the digital control circuit of camera, which is quite convenient as the counter circuit of the digitally controlled camera.

What is claimed is:

1. A counter circuit for a camera in which the exposure information is converted into pulses so as to be counted comprising:
   a) an exposure control means for determining the exposure value as a displacement amount from a first position;
   b) a plural number of the conductor contacts provided on a base plate;
   c) a movable contact means slidable over the base plate in functional engagement with the exposure control means, said means producing an electrical signal when said contact means is brought in contact with the conductor contact;
   d) a pulse generator for producing clock pulses;
   e) a first counter means for counting the clock pulses when said electrical signal is produced;
   f) a second counter means; and
   g) a connecting means being connected between the first counter means and the second counter means in such a manner that the output signal of the first counter means is put in the second counter means after a certain determined number of the pulses have been counted by the first counter means;
   whereby after the elapse of a certain determined time after the movable contact means has been brought into contact with the conductor contact the output signal of the first counter means as a pulse is put in the second counter means so as to count the number of the contacts of the movable contact means with the conductor contacts in such a manner that the influence of the chattering at the initial stage of the contact of the movable contact with the conductor contact is eliminated.

2. A counter circuit for a camera in which the aperture information is converted into pulses so as to be counted comprising:
   a) an aperture control means for determining the aperture value from the displacement amount from a first position;
   b) a base plate including comb tooth shaped conductor contacts;
   c) a slide brush slidable over the base plate in functional engagement with the aperture control means;
   d) a means for producing electrical signals by means of the slide brush with the conductor contacts;
   e) a pulse generator for producing clock pulses;
   f) a first counter starting the counting of the clock pulses in response to the electrical signal;
   g) a second counter; and
   h) a connecting means being connected between the first counter means and the second counter means in such a manner that the output signal of the first counter means is put in the second counter means after a cetain determined number of the pulses have been counted by the first counter means;
   whereby after the elapse of a certain determined time after the brush has been brought into contact with the conductor contacts the output signal of the first counter is put in the second counter so as to count the number of the contacts of the brush with the conductor contacts in such a manner that the influence of the chattering at the initial stage of the contact of the brush with the conductor contacts is eliminated.

3. A counter circuit in accordance with claim 2, wherein the first counter includes a first output terminal producing an output when a certain determined number of the pulses have been counted and a second output terminal producing an output after the first output terminal has produced an output, whereby the first output terminal is connected to the connecting means while an interrupting means for interrupting the input of the pulses into the first counter in response to the output of the second output terminal.

4. A counter circuit in accordance with claim 2, wherein the first counter is a multi-bit binary counter including the output terminals corresponding to the respective bits, whereby the output terminals corresponding to the respective bits at least after the second step are connected to the connecting means.

5. A counter circuit in accordance with claim 4, wherein the connecting means is an OR gate.

6. A counter circuit in accordance with claim 3, wherein the interrupting means is a gate means connected between the first counter and the pulse generator so as to be brought into the closed state in response to the output of the second output terminal.

7. An exposure control circuit for a camera comprising:
   a) a memory means for storing a digital value corresponding to the desired aperture value;
   b) an aperture control means for controlling the aperture value by means of a mechanical displacement amount;
   c) a pulse forming means for producing pulses whose number corresponds with the mechanical displacement amount in functional engagement with the aperture control means, said means including:
      1) a plural number of the conductor contacts provided on the base plate,
      2) a slide contact slidable over the base plate in functional engagement with the aperture means,
      3) a means for forming an output signal at the time of the contact of the slide contact with the conductor contacts, whereby an output signal is produced at each contact of the slide contact with the conductor contacts so as to produce the pulses whose number corresponds with the number of the contact of the slide contact with the conductor contact,
   d) a clock pulse producing means for producing the clock pulse at a certain determined period;
   e) a first counter for counting the clock pulses while the output signal is being produced;
   f) a second counter;
   g) a connecting means for producing a pulse signal to be transferred to the second counter when more than a certain determined number of the clock pulses have been counted by the first counter, whereby the second counter counts the pulses whose number corresponds with the number of the contact of the slide contact with the conductor contacts;

h) a detecting means being connected between the memory means and the second counter so as to produce an output when the relation between the content of the memory means and that of the second counter reaches a certain determined state;
i) a stopping means for stopping the displacement of the aperture control means in response to the output of the detecting means, whereby the aperture control means is displaced by the amount corresponding to the digital value stored in the memory means so as to control the aperture value.

8. An exposure control circuit in accordance with claim 7, wherein the oscillation period of the clock pulse generator is determined in accordance with the displacement speed of the aperture control means.

9. An exposure control circuit in accordance with claim 7, wherein the contact width of each conductor contact is determined in accordance with the displacement speed of the aperture control means in such a manner that the contact time of the slide contact on a conductor contact is constant for all the conductor contacts.

10. An exposure control circuit in accordance with claim 7, wherein the first counter includes a first output termainal producing an output when a certain determined number of the pulses have been counted and a second output terminal producing an output after the first output terminal has produced an output, whereby the first output terminal is connected to the connecting means while an interrupting means for interrupting the input of the pulses into the first counter in response to the output of the second output terminal.

11. An exposure control circuit in accordance with claim 7, wherein the first counter is a multi-bit binary counter including the output terminal corresponding to the respective bits, whereby the output terminals corresponding to the respective bits at least after the second step are connected to the connecting means.

12. An exposure control circuit in accordance with claim 11, wherein the connecting means is an OR gate.

13. An exposure control circuit in accordance with claim 10, wherein the interrupting means is a gate means connected between the first counter and the pulse generator so as to be brought into the closed state in response to the output of the second output terminal.

14. A counter circuit for a camera in which the exposure information is converted into pulses so as to be counted comprising:
a) an exposure control means for determining the exposure value as a displacement amount from a first position;
b) a plural number of the conductor contacts provided on a base plate;
c) a movable contact means slidable over the base plate in functional engagement with the exposure control means, and producing an electrical signal when said movable contact means is brought in contact with the conductor contact;
d) a pulse generator for producing clock pulses;
e) a counter circuit including a first counting portion for counting the clock pulses when said electrical signal is produced and a second counting portion being connected to said first counting portion so as to apply an output signal of the first counting portion to the second counting portion as a pulse after a certain determined number of the pulses have been counted by the first counting portion, whereby after the elapse of a certain determined time after the movable contact means has been brought into contact with the conductor contact, the output signal of the first counting portion as a pulse is put in the second counting portion so as to count the number of the contacts of the movable contact means with the conductor contacts in such a manner that the influence of the chattering at the initial stage of the contact of the movable contact with the conductor contact is eliminated.

* * * * *